(12) United States Patent
Hoogland

(10) Patent No.: US 7,718,110 B2
(45) Date of Patent: *May 18, 2010

(54) METHOD AND APPARATUS FOR FORMING THIN-WALLED PRODUCTS, AND A PRODUCT MANUFACTURED THEREWITH

(75) Inventor: Hendricus Antonius Hoogland, Krommenie (NL)

(73) Assignee: ECIM Technologies B.V., Zaandam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/493,734

(22) PCT Filed: Oct. 25, 2002

(86) PCT No.: PCT/NL02/00680

§ 371 (c)(1),
(2), (4) Date: Sep. 20, 2004

(87) PCT Pub. No.: WO03/039838

PCT Pub. Date: May 15, 2003

(65) Prior Publication Data
US 2005/0037106 A1    Feb. 17, 2005

(30) Foreign Application Priority Data
Oct. 25, 2001 (NL) .................................. 1019235
Nov. 7, 2001 (NL) .................................. 1019320

(51) Int. Cl.
B29C 45/04 (2006.01)
B29C 43/34 (2006.01)
B29C 45/64 (2006.01)

(52) U.S. Cl. .............................. 264/328.7; 264/328.11; 264/328.16; 425/419

(58) Field of Classification Search .............. 264/328.7, 264/322, 328.11, 328.16; 425/411, 419, 425/443
See application file for complete search history.

(56) References Cited

U.S. PATENT DOCUMENTS

| | | | | | |
|---|---|---|---|---|---|
| 2,443,826 | A | * | 6/1948 | Johnson | 425/236 |
| 2,532,501 | A | * | 12/1950 | Johnson | 264/40.5 |
| 2,641,848 | A | * | 6/1953 | Wilson | 34/554 |
| 3,411,215 | A | * | 11/1968 | Fields | 34/389 |
| 3,924,993 | A | | 12/1975 | Terrell | |
| 4,154,784 | A | * | 5/1979 | Ruhl | 264/45.5 |
| 4,155,972 | A | * | 5/1979 | Hauser et al. | 264/250 |
| 4,357,294 | A | * | 11/1982 | Hetherington et al. | 264/294 |
| 4,489,033 | A | | 12/1984 | Uda et al. | |
| 4,710,118 | A | * | 12/1987 | Krishnakumar et al. | 425/130 |
| 4,828,769 | A | * | 5/1989 | Maus et al. | 264/1.31 |
| 5,044,925 | A | * | 9/1991 | Watanabe | 425/542 |

(Continued)

FOREIGN PATENT DOCUMENTS

FR    2 620 076 A1    10/1986

(Continued)

*Primary Examiner*—Matthew J. Daniels
(74) *Attorney, Agent, or Firm*—Hoffman & Baron, LLP

(57) ABSTRACT

A method for forming thin-walled products from low-melt plastic in a mold, wherein an amount of the plastic, heated, is introduced into a mold cavity, with the mold at least partly opened, whereafter the mold is closed, such that the plastic in the mold cavity is pressed away by the wall parts of the mold cavity, whereby a complete filling of the mold cavity is obtained.

34 Claims, 8 Drawing Sheets

| | U.S. PATENT DOCUMENTS | | | | GB | 890639 | 3/1962 |
|---|---|---|---|---|---|---|---|
| | 6,156,242 A | * | 12/2000 | Saito et al. .................... 264/2.2 | JP | 61177222 A | 12/1986 |
| | 6,290,882 B1 | * | 9/2001 | Maus et al. ................... 264/2.2 | JP | 02009614 | 3/1990 |
| | RE38,617 E | * | 10/2004 | Saito et al. .................... 264/2.2 | JP | 02147225 A | 8/1990 |
| 2001/0007378 A1 | | | 7/2001 | Ewing et al. | WO | WO 97/20315 | 6/1997 |
| 2001/0010412 A1 | | | 8/2001 | Klotz | WO | WO 98/41379 * | 9/1998 |

FOREIGN PATENT DOCUMENTS

FR        2 792 244 A1    10/2000

\* cited by examiner

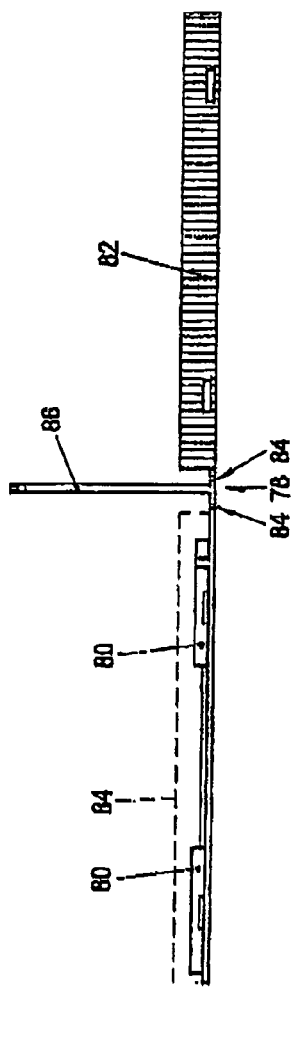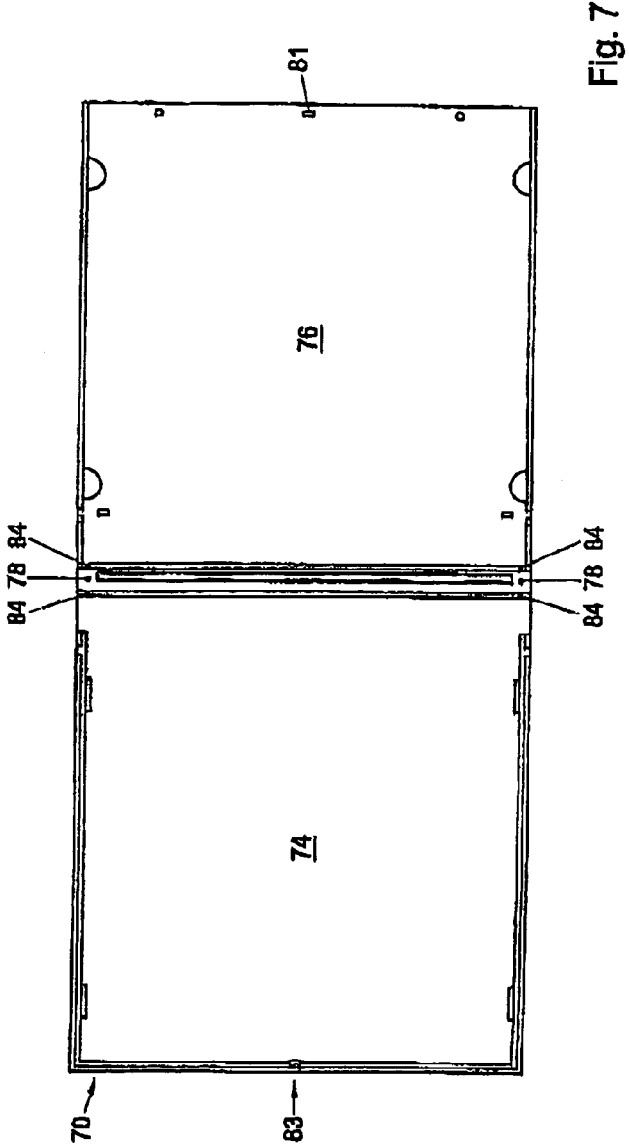

METHOD AND APPARATUS FOR FORMING THIN-WALLED PRODUCTS, AND A PRODUCT MANUFACTURED THEREWITH

This application is the U.S. National Phase of International Application No. PCT/NL02/00680 filed on Oct. 25, 2002, which incorporated herein by reference. This application also claims priority to Netherlands Application No. 1019235 filed on Oct. 25, 2001, and Netherlands Application No. 1019320 filed on Nov. 7, 2001, both of which are incorporated herein by reference.

BACKGROUND OF THE INVENTION

The invention relates to a method for forming thin-walled products from plastic in a mold.

Thin-walled products are usually manufactured from plastic by injection molding in a mold. To this end, materials are used having a relatively high Melt Flow Index (MFI), at least a high melt. Such a high MFI means that the plastic in flowable form has a low viscosity and hence can traverse relatively long flow paths of small dimensions in a mold cavity. The ratio between the length of a flow path and the minimum passage height of the flow path involved is usually designated as the Melt Flow Rate (MFR). A high MFR therefrom means a relatively long, narrow flow path. Injection molding is possible, in principle, with plastics having a high MFI, with a direct relation existing between the MFI and the MFR. A higher MFR required a higher MFI. It will be clear, therefore, that plastics having a low melt, at least a low MFI, do not permit of injection molding, at least not to form thin-walled plastic products, since thin-walled plastic products have an MFR that is too high for that. This means that only products having relatively thick walls and relatively short flow paths can be injection molded from low-melt plastics. Moreover, such methods require relatively high closing forces and a relatively long cycle time, which is economically disadvantageous.

One object of the invention is to provide a new method for forming plastic products in a mold.

Another object of the invention is to provide such a method with which products can be formed in a mold from plastics having a relatively low melt.

A further object of the invention is to provide a method with which products can be manufactured in a mold, from plastic, in which a relatively low closing force can be used and a method with which relatively short cycle times can be achieved.

These and further objects are achieved with a method according to the invention.

SUMMARY OF THE INVENTION

In a method according to the invention, plastic is introduced into a mold cavity whose volume differs slightly from the volume of the product to be formed therein. Only when the amount of plastic necessary for forming the product has been introduced into the mold cavity is the mold cavity brought into its final form, such that plastic is displaced and distributed throughout the mold cavity. Here, the plastic can in principle be introduced under a relatively low pressure, so that a relatively low closing force will suffice. The resistance to which the plastic is subject when being introduced will be less than when a product is injection molded from the same plastic, if this is possible at all, in the conventional manner.

In a method according to the present invention, plastic products can be formed relatively rapidly, that is, at low cycle times, from all kinds of plastics, and which have relatively small wall thicknesses which, moreover, if desired, may differ relatively strongly within the product.

In a further embodiment of a method according to the invention, low-melt plastic is introduced into a mold cavity in heated condition, with the mold at least partly opened. Without wishing to be bound by any theory, it seems that, as a result of this, over a first part of the filling path of the mold, flow paths are obtained having such dimensions that an MFR is obtained that matches the MFI of the plastic involved. During or after introduction of the plastic into the mold cavity such that it is partly filled with the plastic, the mold is closed, at least the mold cavity is brought into the shape corresponding to the desired final product, as a result of which the plastic is pressed further into the mold cavity. As the mold cavity initially is only partly filled, as a result of the fact that the total volume of the mold cavity with the mold open is larger than the final volume with the mold closed, a filling front is formed. Filling front should herein be understood to mean the edge of plastic in the mold cavity leading in the direction of flow. The closure of the mold can then be controlled such that directly ahead of the filling front there is always a flow path whose Melt Flow Rate approximately matches, at least is equal to or smaller than, the MFI of the plastic involved. This means that it is always ensured that plastic is displaced over the desired distance and therefore leads in a simple manner to complete filling of the mold cavity.

In a method according to the invention, preferably a mold cavity is used which, in completely closed conditions, starting from the or each injection point for the plastic, has a Melt Flow Rate that is higher, in particular much higher, than the MFI of the plastic to be used, at least higher than is suitable for injection molding the plastic involved. However, when injection of plastic is commenced, the form of the mold cavity is adjusted such that an MFR is obtained that is suitable for the MFI of the plastic involved. Preferably, according as the filling degree increases, the mold cavity is brought further and further in the direction of the eventual desired from, as a result of which the plastic is continuously kept in motion and always a suitable MFR is maintained for the instant or residual part of the flow paths.

In a method according to the invention, it is preferred that during filling of the mold cavity the plastic is continuously kept in motion through movement of mold parts and/or mold cavity parts. This prevents the occurrence of undesirable solidification, so that, particularly when using transparent plastics, undesirable haze formation can be prevented. Specifically with plastics such as PET (polyethylene terephthalate) having excellent translucency and high impact strength, a method according to the invention is particularly advantageous because the clearness can thus be preserved, also in the case of molds of thin-walled products, without using conventional blow molding techniques.

In further elaboration, a method according to the invention is preferably characterized by the measures according to claim 5.

As a result of the thermal insulation of mold cavity forming parts from the further mold, at least from cooling means thereof, the advantage is achieved that cooling of the plastic which is introduced into the mold cavity can be delayed, in particular until the mold is partly or completely closed, at least the mold cavity is completely filled in the final form. The heat capacity of the thermally insulated forming members is preferably such that they can be heated very rapidly by the heated plastic introduced, whilst they can be cooled relatively rapidly by the cooling means of the mold. In such a method, the flow of plastic is promoted still better, while, moreover, in the case of clear plastics, this clearness can be maintained even better.

In a further advantageous embodiment, when introducing the plastic, in any case when closing the mold, at least a part of the mold cavity forming members is retracted, so that in the substantially closed position of the mold the volume of the mold cavity is greater than the volume of the product to be eventually formed. After introduction of at least substantially all the required plastic, the retracted part is actively moved in the mold cavity so as to obtain the eventual desired shape of the product, with plastic being displaced to obtain the desired complete filling.

An additional advantage of a method according to the invention may be that after-pressing of the mold, as in conventional injection molding, can at least largely be omitted, which can simplify the required apparatuses and can lead to shorter cycle times.

It is further preferred that, in a method according to the invention, the plastic, prior to introduction into the mold cavity, is dried, at least that any moisture present is at least largely removed therefrom, so that an undesirable disturbing effect of the moisture in the mold cavity is avoided. In particular again in the case of clear plastics, this is particularly advantageous because haze formation is thereby prevented still better.

Surprisingly, it has been found that with a method according to the present invention, in a simple manner, products can be manufactured that are thin-walled, while moreover hinges can be integrally formed. Such integrated hinges, usually designated as living hinges, offer the advantage that movable parts can be obtained without necessitating assembly steps. With a method according to the present invention, such hinges can even be formed in substantially completely transparent products, that is, products having a haze less than 5%, more in particular less than 3%, so that, for instance, (blister) packages, holders, and the like, with a particularly pleasant appearance can be formed.

In a further advantageous embodiment, an at least partly holder-shaped product is manufactured, with a label or like cover being provided on the inside, which screens the plastic from the contents to be received therein. This prevents contact, during use, between the contents and the plastic, which is particularly advantageous specifically if, for instance, foods, pharmaceutical products, or the like, are to be stored in the container. In such a method, also in the application mentioned, recycled plastics, such as recycled PE, PET, PS, and the like, can be used. Moreover, the advantage is thus obtained that with relatively inexpensive plastics, for instance as mentioned above, relatively thin-walled holder-shaped products can be manufactured which are light and yet sufficiently stiff.

In further elaboration, such a label can be provided on the inside of the holder-shaped part, with a printing being provided on this label, on the side facing the wall against which it is provided, or on this wall, covered by the label, the wall being manufactured from a plastic that is at least partly and preferably completed translucent, so that the printing is visible from the outside of the product. The printing is thus protected from the influences from outside, while, as indicated, contact between the plastic and the contents during use is avoided. To apply a label, for instance in-mold labeling technique can be used, or the label can be inserted later. Of course, the printing can also be provided on the inside of the holder, after which it can be covered, for instance by a protective layer of lacquer of the like. In an alternative embodiment, at least the holder-shaped part of the product can also be labeled and/or printed on both sides, that is, the inner side and the outer side.

The invention further relates to a mold-formed, substantially thin-walled plastic product, characterized by the features according to claim 18.

Such a product offers the advantage that all kinds of particular product characteristics can be obtained that could not be obtained in products according to the state of the art. Thus, for instance, products can be formed from plastic having a melt that is particularly low, for instance an MFI less than 18, with wall thicknesses that are particularly small in proportion to the other dimensions of the wall parts involved. Thus, for instance, bent or flat wall parts can be obtained that have a thickness of a few tenths of millimeters, with outer dimensions of the respective wall part of a few centimeters or more; products that could hitherto be manufactured only from plastics having a high MFI, for instance polyethylene or polystyrene.

A product according to the invention can be manufactured in a relatively inexpensive and simple manner from relatively inexpensive plastic, having, for instance, impact strength, flexibility, with integrated hinges, being crystal-clear or opaque, while moreover materials can be used that have less environmental impact than, for instance, PVC.

A product according to the invention may be manufactured, for instance, from PET (polyethylene terephthalate), with, for instance, at least one living hinge, and is particularly suitable as storage device for, for instance, disk-shaped data carriers such as CDs, CDi, CDRom, Chipcard, Simcard, or the like, but also for other products, for instance papers, foods, and the like, also as a blister package.

The invention further relates to an apparatus for forming products according to the invention or the use of a method according to the invention, characterized by the features according to claim 27.

Such an apparatus enables particularly simple manufacture of products that are relatively thin-walled, with relatively long flow paths, that is, having a high MFR, from plastic having a low melt, at least low MFI. Thus, products can be manufactured that have particularly advantageous product characteristics, such as, for instance, high clearness, high impact strength, high flexibility, low cost, FDA approval, recyclability, monopackages, suitability for low and/or high temperatures, and the like, depending on the selected plastic.

In a method and apparatus according to the invention, furthermore, the advantage is achieved that the closing force for closing the mold and keeping it closed is relatively low with respect to that required in the manufacture of comparable products in a conventional manner, that is, by injection molding. This means that relatively small, light machines can be used.

BRIEF DESCRIPTION OF THE DRAWINGS

In the further subclaims, further advantageous embodiments of a method, product and apparatus according to the invention are described. To clarify the invention, exemplary embodiments of a method, product and apparatus according to the invention will be elucidated in more detail with reference to the drawing. In the drawing:

FIGS. 6-8 show, in side view, top view, and partly sectional front view, a storage device according to the invention;

DETAILED DESCRIPTION OF THE INVENTION

Figure 1:
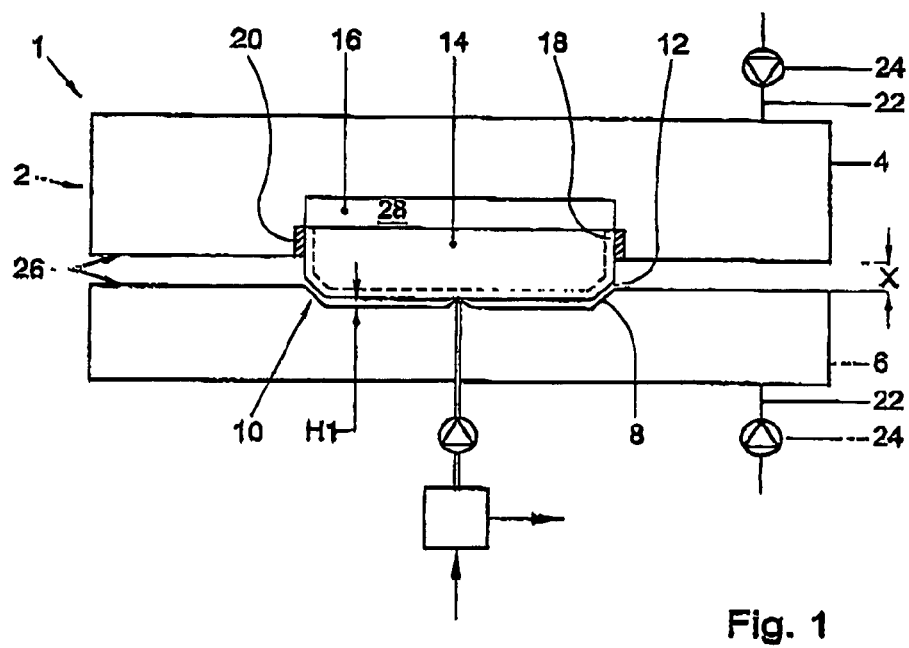
FIG. 1 diagrammatically shows, in sectional side view, an apparatus according to the invention.
Figure 2:
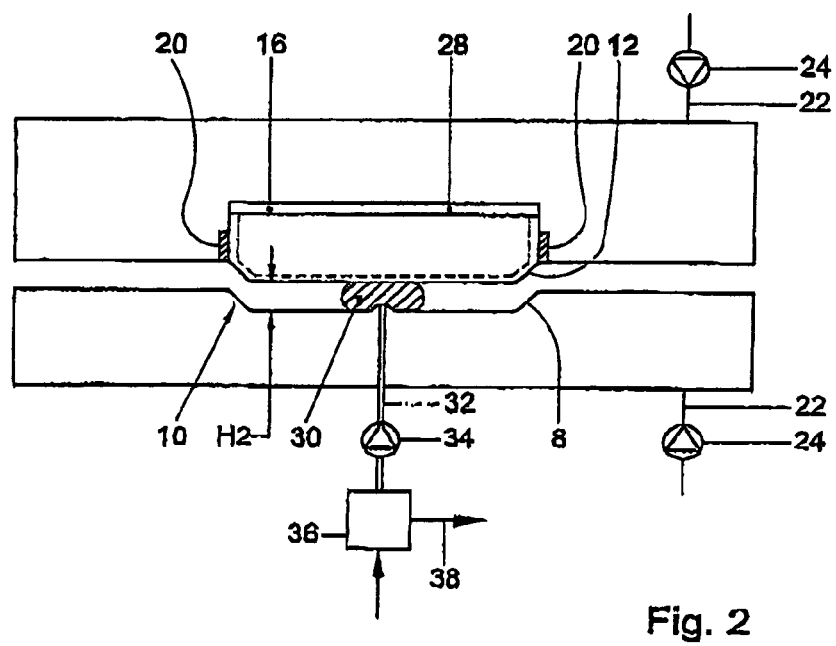
FIGS. 2 and 3 show, in two steps, the use of an apparatus according to FIG. 1.
Figure 3:
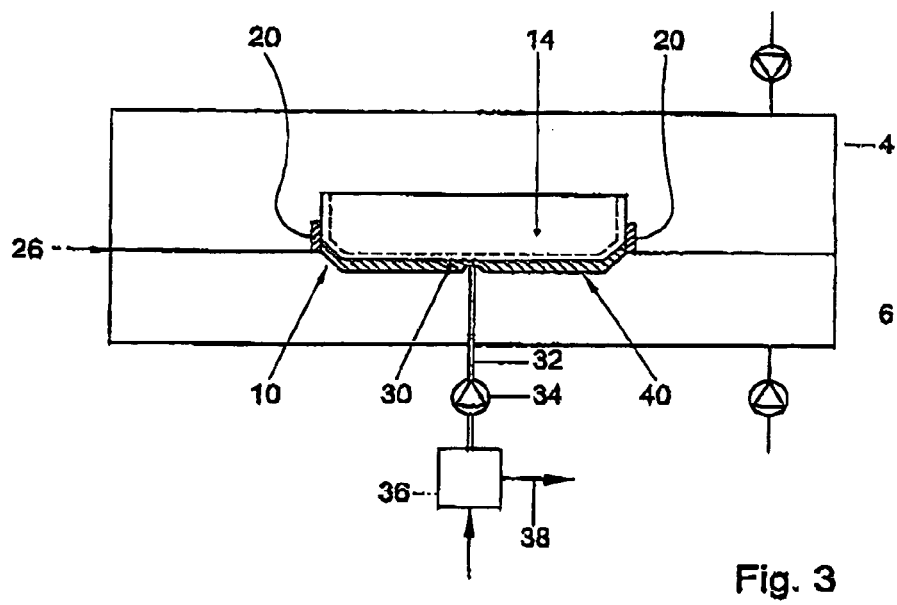

In this description, the same or corresponding parts have the same of corresponding reference numerals. In this description, the designation Melt Flow Rate (MFR) is used, which is a conventional designation for the ratio between the minimum passage height in a flow path, at least the minimum passage, and the length of the flow path. In addition, the term Melt Flow Index (MFI) is used, which is a material-related index for the viscosity in "flowable" form, that is, at a temperature at which the plastic can flow at least to some extent. The MFR and MFI are standardized inter alia in ISO standard 1188. In will be clear, however, that the present application is not limited thereto.

FIG. 1 diagrammatically shows, in sectional side view, a portion of an apparatus 1 according to the invention, which comprises a mold 2 provided with a first mold part 4 and a second mold part 6. The second mold part 6 includes a female part 8 of a mold cavity 10; the first mold part 4 includes a male mold part 12 of the mold cavity 10. The male mold part 12 is defined by a forming member 14, which is movably included in a cavity 16 in the first mold part 4. The forming member 14 is of hollow design with relatively thin walls 18, shown by the broken line, so that the heat capacity of this forming member 14 is relatively low. Provided around the forming member 14 is a thermally insulating seal 20 over a part of the height of the chamber 16, while the first and second mold parts 4, 6 are provided with cooling means 22, diagrammatically indicated by a line with a pump 24. These cooling means 22 are designed, for instance, in a conventional manner as cooling channels (not shown) extending around the mold cavity 10, through which channels cooling liquid can be pumped at a relatively low temperature, for instance a few degrees Celsius.

In FIG. 1, the mold 2 is shown in the opened position, such that there is a distance X between the land areas 26. Included in the chamber 16 are pressure means for biasing the forming member 14 into an extended position, shown in FIG. 1, such that the male part 12 is located at a relatively small distance $H_1$ from the female part 8, at least the bottom thereof. The pressure means in the chamber 16 may be formed, for instance, by a slightly compressible liquid, elastic material, or the like, or, as will be described in more detail with reference to FIG. 5, comprise controllable pressure means. The pressure means 28 in the chamber 16 are of such design that upon introduction of plastic 30 into the mold cavity 10 the male mold part 12 can be pressed away into the chamber 16, so that the distance between the male part 12 and the female part 8 increases, for instance to a distance $H_2$. Plastic 30, for instance polyethylene terephthalate (PET) or another plastic having a low Melt Flow Index, for instance less than 18, more particularly less than 12, and preferably for instance about 6 or less, is introduced into a mold cavity 10 via an injection channel 32 with the aid of a pump 34 or another injector known from the injection molding technique, while displacing the forming member 14, which forming member, as a result of the temperature of the plastic, for instance about 270° C. for PET, is rapidly heated to a comparable temperature, thermally insulated by the seal 20. This prevents a premature change of the material characteristics, in particular solidification and hazing of the plastic 30, in particular the PET mentioned. Prior to introduction of the plastic 30 into the cavity 10, the plastic 30 is dried in a device 36, for instance by suitable preheating, with moisture 38 being discharged.

Figure 8:
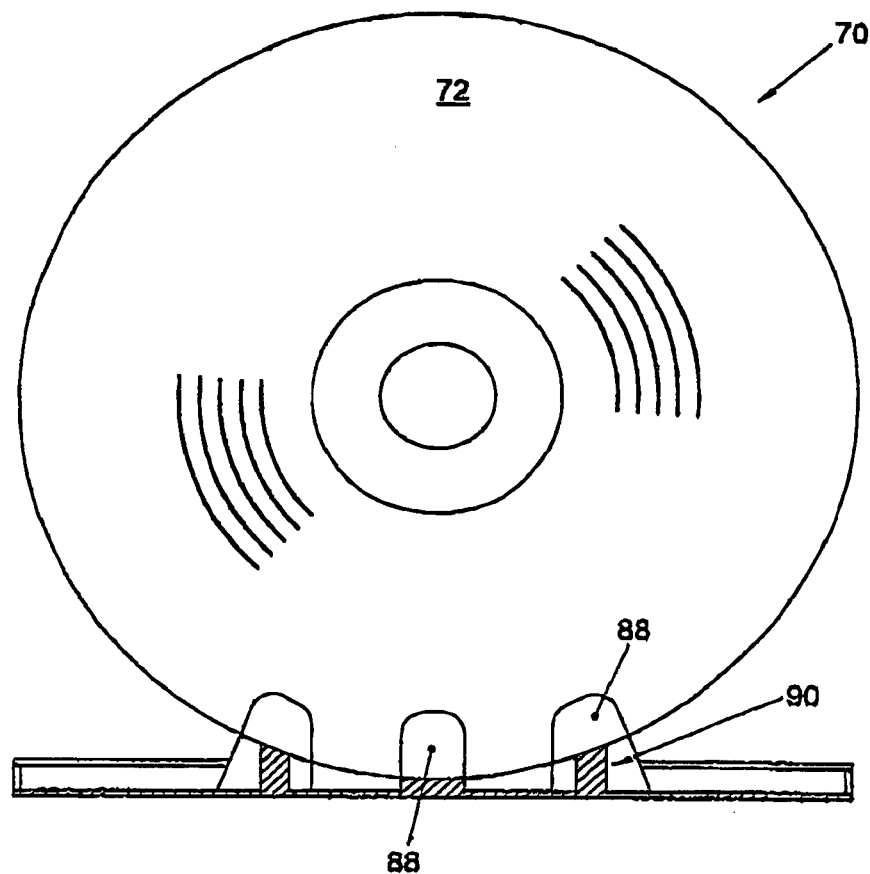

After the plastic 30 has been introduced into the mold cavity 10 as a relatively thick, highly viscous liquid, while the space in the mold cavity 10 is relatively large due to the distance $H_2$, the mold is closed, as shown in FIG. 8. In this condition, the forming member 14 is virtually completely received within the chamber 16, and the land areas 26 are in mutual abutment. The mold cavity 10 is completely filled with plastic 30, whilst the desired shape of the product 40 has been obtained. In this situation, there is relatively much contact between the mold part 4 and hence the cooling means 22 and the forming member 14, as a result of which the desired cooling of the product 40 is obtained, such that upon complete opening, that is, further than the distance X in FIG. 1, the product 40 can be taken out, and the mold can be made suitable for a new production cycle. During the filling of the mold cavity and closing of the mold, it is ensured that the plastic 40 keeps flowing continuously, in the direction of the ends of the mold cavity 10, thereby preventing the occurrence of premature undesired changes in the material characteristics.

It has been found that in particular when using, for instance, PET, it is particularly advantageous if the plastic keeps flowing continuously during introduction into and filling of the mold, while prior to introduction this plastic has been dried nearly completely and the walls of the mold cavity 10 are relatively warm during filling of the mold, because in this way the clearness of the plastic is maximally preserved. This affords the possibility of manufacturing thin-walled products as shown in, for instance, FIGS. 6-9 as a replacement of, for instance, polystyrene, polycarbonate, polypropylene, and the like.

It has been found that a method according to the invention is particularly suitable for use with crystalline plastics such as PET, polycarbonate and the like. Without wishing to be bound by any theory, this seems to be the result of the orientation direction of the monomer and/or polymer chains and the fact that such plastics in principle have a relatively small transition range between fluid and solid form. Such plastics seem to have a glass transition point rather than a glass transition range, as a result of which the temperature control in the mold is particularly critical. A method according to the invention enables controlling the temperature in the plastic such that it always remains fluid until the mold cavity has been filled. Thus, when relevant, the transparency is maintained. A further advantage of the relatively low pressure at which the plastic is introduced into the mold cavity seems to reside in the fact that the polymer chains are subject to less strong loading during the introduction, of the plastic, so that stresses in the plastic and in the final product are reduced notably. Thus, a product is obtained which is more form stable, while, moreover, so-called oil stain effect on the surface of such plastic products, causing discoloration on the surface, is prevented. Stresses in plastic products can generally be demonstrated by ultraviolet light.

Figure 5:
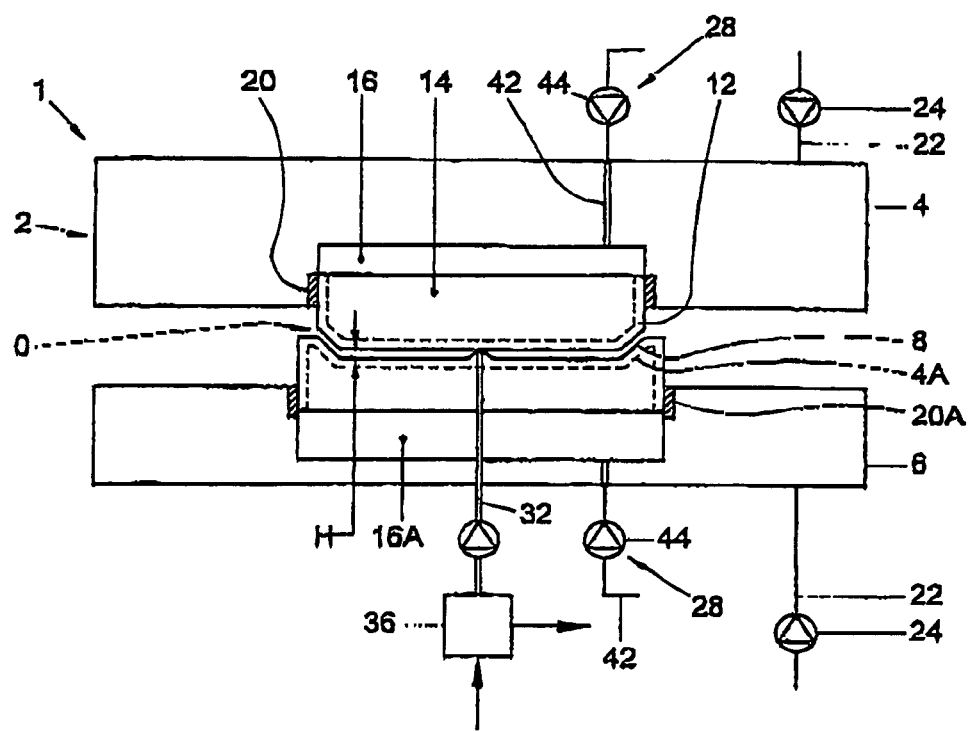
FIG. 5 diagrammatically shows, in sectional side elevation, an alternative embodiment of an apparatus according to the invention.

FIG. 5 diagrammatically shows, in sectional side view, an alternative embodiment of an apparatus according to the invention. In this embodiment, not only the male part 12 is movably received in a chamber 16 as part of a forming member 14, but also the female part 8 on a second forming member 14A in a second chamber 18A in the second mold part 6. In this embodiment, the means 28 for biasing the forming members 14, 14A are designed as at least one supply line 42 with a pump 44 for introducing into the chambers 16, 16A, or discharging therefrom, a pressure liquid such as hydraulic oil with which in each case the counterpressure of the two forming members 14, 14A and hence the distance H can be accurately controlled. Again, the forming members 14, 14A of the mold parts 4, 6 are thermally separated by the sealing means 20, 20A, at least in the position shown in FIG. 5. Only when closing the mold 2 does thermal contact arise between the mold parts 4, 6 and the forming members 14, 14A for cooling them and hence the product. It will be clear that combinations of the different parts as shown in FIGS. 1-3 and 5 are possible.

Figure 4A:
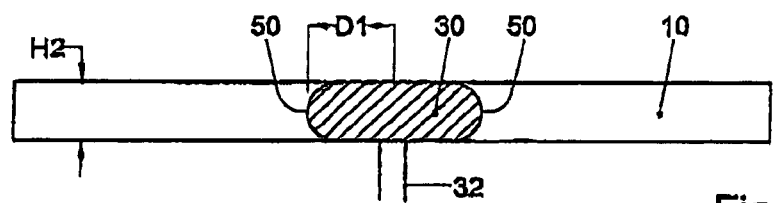
FIGS. 4A-C show, in three steps, the filling of a mold cavity in a method and apparatus according to the invention.
Figure 4B:
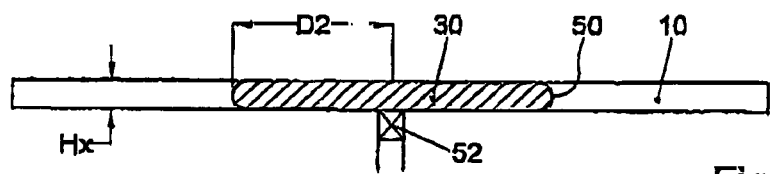
Figure 4C:
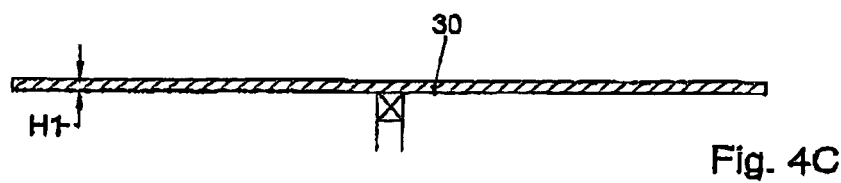

FIGS. 4A-C diagrammatically show the flow of the plastic 30 in the mold cavity 10. In these Figures, the plastic 30 is represented by hatching, the mold cavity is represented diagrammatically as a rectangle.

In FIG. 4A, the distance $H_2$ between the mold parts is relatively great, as a result of which the plastic 30 has moved from the inflow line 32 over a relatively short distance $D_1$ into the mold cavity 10, to either side, at least, to all sides. The flow front 50 is therefore located close to the inlet opening 32.

After the desired amount of plastic 30 has been introduced into the mold cavity 10, the supply line 32 is closed, diagrammatically represented by a cross 52, and the distance between the mold parts is reduced to $H_2$, as a result of which the flow front 50 is displaced in the direction away from the supply line 32, so that the total flow path of the plastic 30 increases to $D_2$. This means that between FIGS. 4A and 4B the plastic has been moved over a distance $D_2$-$D_1$, with decreasing passage height H.

When the mold parts, at least the parts forming the mold cavity 10, are moved further towards each other, the flow front 50 is pushed away still further, until, as shown in FIG. 4C, the mold cavity 10 is completely filled and the desired product thickness $H_1$ has been reached. It will be clear that just before the condition as shown in FIG. 4C has been reached, the plastic must be pressed through a minimal passage height $H_1$. Since this needs to be done only over a very short distance, in each case is suitable Melt Flow Rate matching the plastic has been obtained.

In FIGS. 6-8, a storage device 70 is shown, known per se from the international patent application PCT/NL/96/00459, which, as an example, is understood to be incorporated herein by reference. It is expressly observed that this example should in no way be interpreted in a limitative sense.

A device 70 according to the invention is particularly suitable for storage and transmission of data carriers such as CDs 72. Data carriers should herein be taken in the broadest sense of the word and may also comprise other data carrying products, such as paper, cardboard, plastic, provided with printing, figures, text, or the like.

A storage device 70 according to the invention comprises a first cover part 47, a second cover part 76, and an intermediate part 78 connecting the two cover parts 74, 76. The cover parts 74, 76 are provided with the edges 80, 82 such that in closed position a closed package is obtained, as diagrammatically represented by the broken line 84. Diagrammatically shown are closing means 81, 83 which can keep the storage device 70 in closed position. The intermediate part 78 is connected on opposite sides via an integrated hinge (living hinge) to an adjacent cover part 74, 76. Provided on the intermediate part 78 are fixing means 86, for instance in the form of pairs of clamping fingers 88, between which an edge of the data carrier 72 can be clamped, as represented in FIG. 8. Optionally, the fingers 88 may be interconnected by ridges 80 for increasing the clamping force. It will be clear that the data carrier can be fixed, at least enclosed, in the storage device 70 in many different ways, for instance also in a manner as known from the jewel box, on one or both cover parts 74, 76. These and other fastening means are sufficiently known from practice.

In a particular advantageous embodiment, a storage device 70 according to the invention, for instance as shown in the drawing, is manufactured from a clear translucent plastic such as PET and manufactured in the manner described earlier, so that translucency is fully preserved. Here, the haze can be, for instance, less than 5%, even less than 8%. Given suitable process parameters, which can be easily determined within the outlined limits by those skilled in the art, even a substantially completely haze-free plastic can be obtained.

Figure 9:
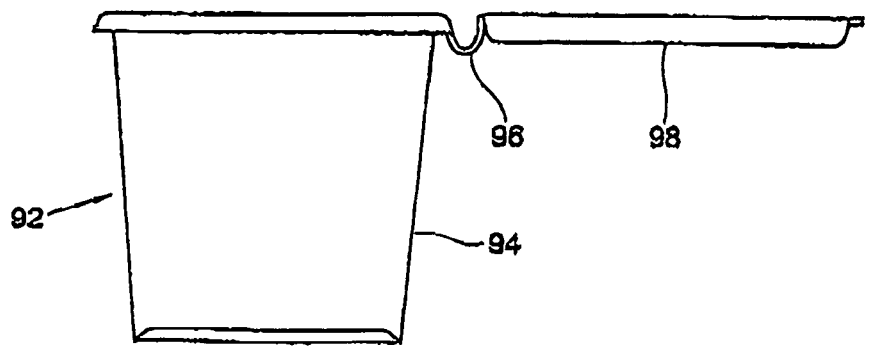
FIG. 9 diagrammatically shows, in side view, a holder manufactured with a method and apparatus according to the invention.

In FIG. 9, an alternative holder 92 is shown, in the form of a cup-shaped container 94 with a cover 98 connected thereto via a hinge 96. The hinge 96 is integrally formed that is, integrated with the container 94 and the cover 98. In the same manner, a blister package can be manufactured, for instance by making the container 94 of slightly less high design, while closing means may be provided in a conventional manner, which can be integrally formed, for locking a product or products to be packaged in the blister.

In a method according to the invention, for instance used with a holder 92 according to FIG. 9, different parts can acquire different degrees of translucency, for instance by cooling the cover part 98 of the mold sooner, making this part slightly milk white and less translucent, opaque. It is even possible to give different cooling rates to different surface portions of mold forming members, so that, for instance, on a relatively clear cover part an opaque logo can be formed as an integral part, without, for instance, other roughnesses being necessary, although such is possible.

FIGS. 10A-C schematically show in sectional side elevation to apparatus 1 according to the invention, in a further alternative embodiment, in three successive steps when using a method according to the invention. The same parts again have the same reference numerals.

In FIG. 10A, the mold 1 is shown in opened position. The lower mold half 6 comprises a female part 8 of the mold cavity 10; the upper mold half 4 comprises a male part 12, partly defined by a slide 13, which can slide along a fixed part 12A. In the embodiment shown, the slide is connected to a connecting rod 28A and a schematically represented piston-cylinder assembly 28B. However, any other suitable manner may naturally be used for moving the slide 13, for instance as described earlier. When the mold 1 is open, as represented in FIG. 10A, the slide 18 is retracted, that is, moved in the direction of the upper mold part 4, away from the female part 8.

In FIG. 10B, the mold halves 4, 8 have been moved onto each other, so that the mold cavity 10 is closed, with the slide 18 held in the retracted position and the volume of the mold cavity 10 being greater than the volume of the product to be formed. The distance $H_2$ between the free end of the slide 18 and the opposite bottom surface of the female part 8 is then relatively great. In this condition, plastic is introduced into the mold cavity 10 via the supply line 32. The amount of plastic is adjusted to the volume of the eventual product to be formed, for instance a holder 92 as shown in FIG. 11.

After the plastic has been introduced into the mold cavity 10, then, as represented in FIG. 10C, the slide 13 is moved further into the female part 8 of the mold cavity 10, such that the distance H between the free end of slide 13 and the bottom surface of the female part 8 corresponds to the desired wall thickness. As a result, in the manner described earlier, plastic is displaced, so that a complete, at least desired, filling of the mold cavity 10 is obtained.

Figure 10:
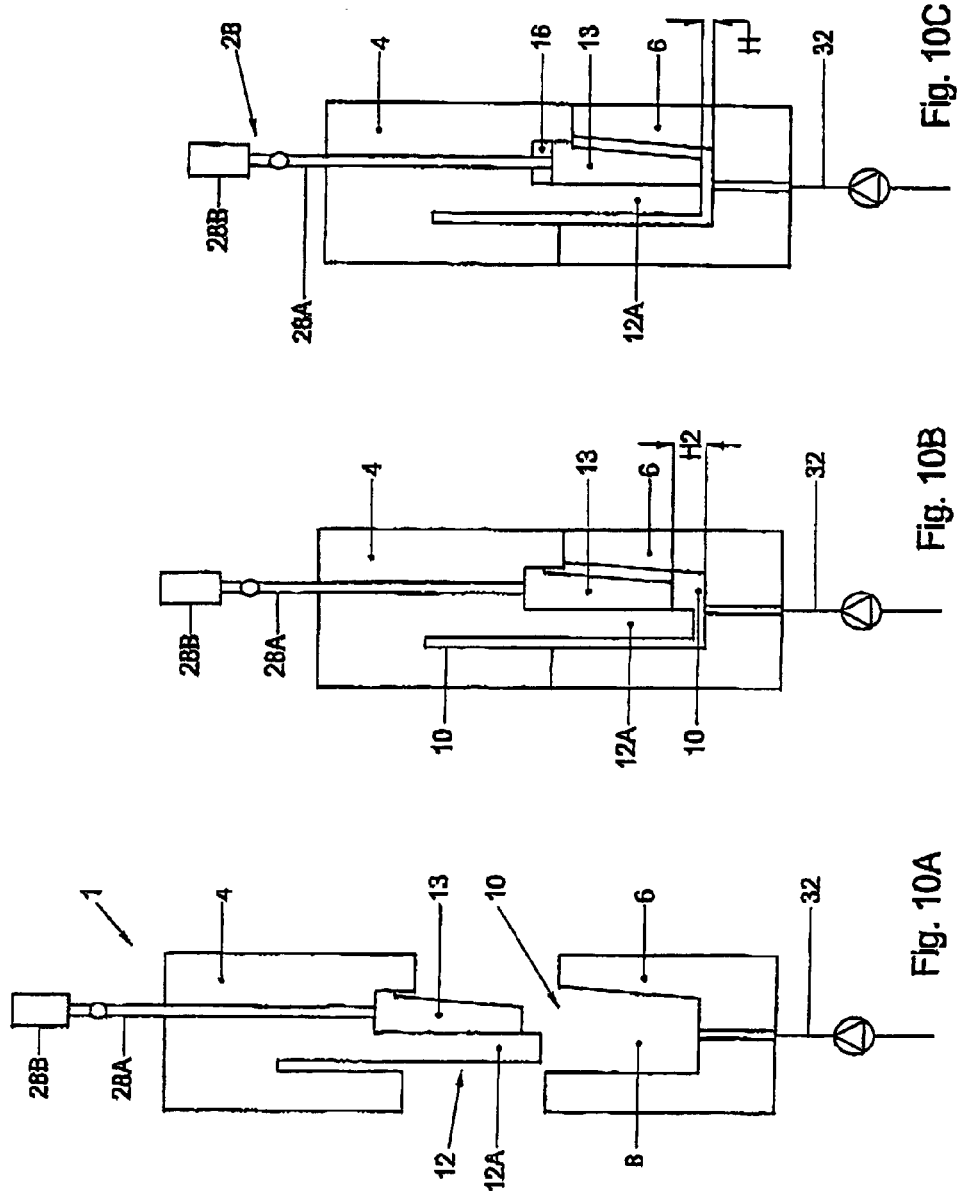
FIGS. 10A-C show, in three steps, the use of an apparatus according to the invention, in an alternative embodiment.
Figure 11:
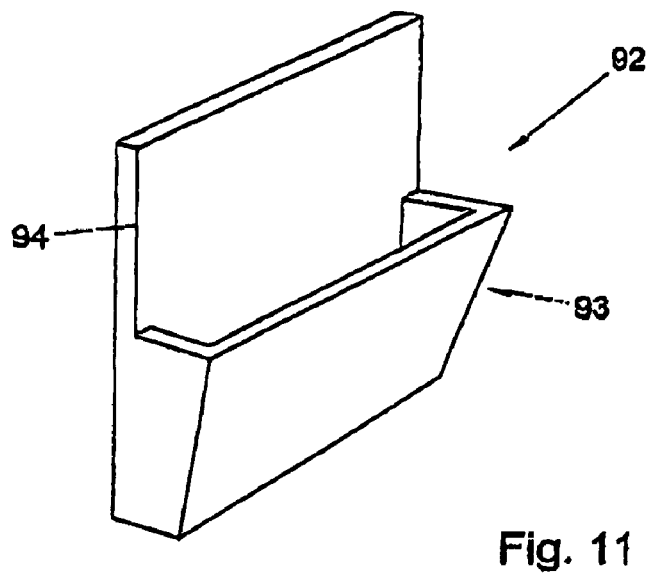
FIG. 11 diagrammatically shows, in perspective view, a product formed with an apparatus according to FIG. 10.
Figure 14:
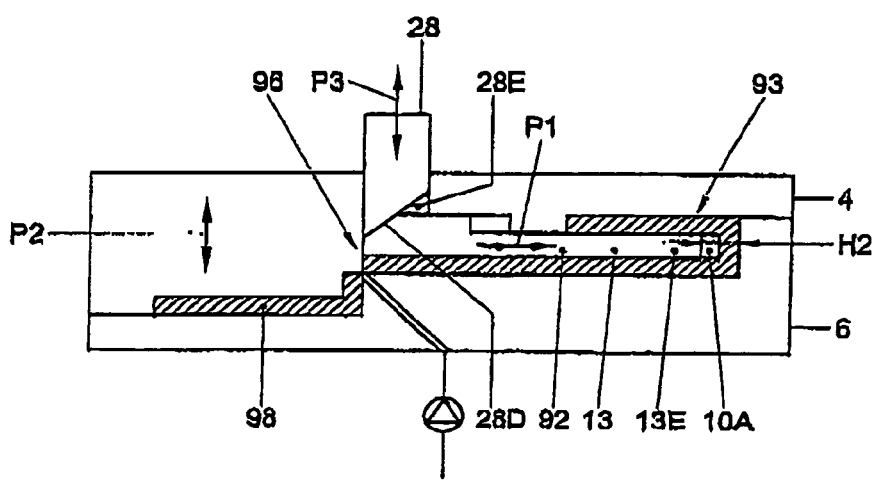
FIG. 14 diagrammatically shown, in sectional side view, an apparatus according to the invention in a further alternative embodiment.

FIG. 11 schematically shows in perspective view of a product 92 with a holder-shaped part 98 and a back wall 94, for instance formed with an apparatus according to FIG. 10 or 14.

Figure 12:
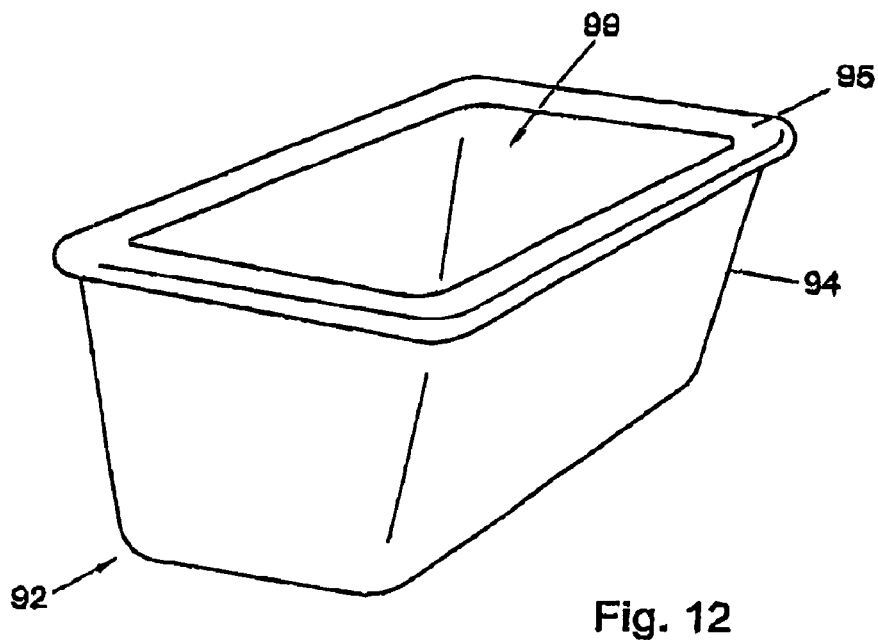
FIG. 12 shows a further alternative embodiment of a container according to the invention.
Figure 13A:
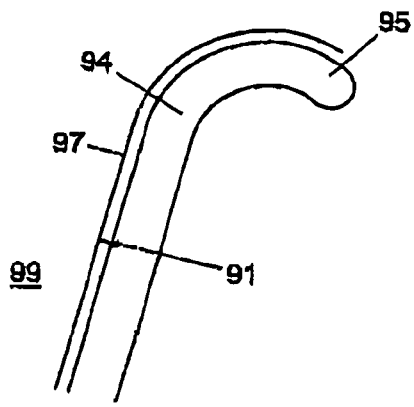
FIGS. 13A-B show, in sectional view, a portion of a wall of a product according to FIG. 12.

FIG. 12 shows an alternative embodiment of a holder-shaped product 92 according to the invention, for instance in the form of a butter tube which comprises a longitudinal wall 94 with a flanged upper edge 95 and in whose interior 99 contents can be stored, for instance foods such as butter or margarine, other spreads, pharmaceutical or body care products or the like, or products of a different nature. On the inner side 99 of the wall 94, as shown in FIG. 13A, a lining 97 has been provided, in particular a plastic label which may be provided, for instance, by in-mold labeling. The label 97 preferably covers the complete inside of the wall 94, extending as far as or over the longitudinal edge 95, so that direct contact between the wall 94 and the contents on the inside 99 is avoided. The wall 94 can be manufactured, for instance, from recycled plastic without FDA approval, while the label 97 preferably is suitable for contact with foods, pharmaceuticals and the like. It is preferred here that the wall 94 is manufactured from the translucent plastic such as PET, while on the side of the label 97 proximal to the wall 94, a printing 92 is provided, which is visible from the outside of the container 92, through the wall 94. Incidentally, the printing 91 can also be provided against the wall 94 and subsequently be covered by a covering, for instance the label 97.

Figure 13B:
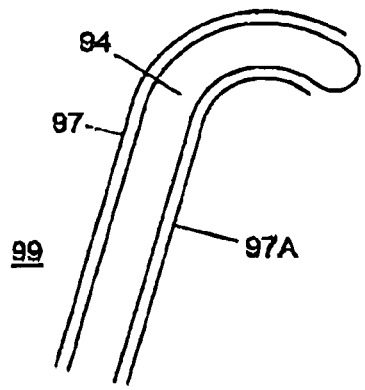

FIG. 13B shows a sectional view of a wall part of the container 92, with a first label 97 provided on the inside and a second label 97A on the outside. Thus, the wall 94 is protected on both sides, while moreover an attractive appearance is obtained.

In FIG. 14, a further embodiment of an apparatus 1 according to the invention is shown, somewhat similar to that shown in FIG. 10. In this embodiment, however, a slide 13 is movable in a direction $P_1$, at right angles to the direction $P_2$ in which the mold parts 4, 6 can be moved relative to each other. An activation slide 28 as an operating means for the slide 13 is provided in the upper mold part 4, which is movable in a direction $P_2$. In the embodiment shown in FIG. 14, in this apparatus 1 a product 92 can be formed, having a holder-like part 93 and a cover 98 connected thereto via a hinge 96. With the mold open (not shown), the slide 13 is moved away to a maximum extent, to the left in FIG. 14, so that a product 92 comes off it and can be removed. Thereupon, the slide 13 is moved back to the position shown in FIG. 14 and the mold parts 4, 6 are pressed onto each other, so that a mold cavity 10 is obtained having a volume slightly greater than the volume of the product to be formed. Specifically, for the free end 13E of the slide 13, shown on the right-hand side in FIG. 14, a cavity 10A is provided. The distance $H_2$ between the free end 13E and the opposite surface of the mold cavity is greater than the wall thickness to be formed there. After the mold has been closed and plastic 30 has been introduced into it, the slide 28 is moved, in downward direction in FIG. 14, so that, due to the cooperating inclined surfaces 28C, 28D, the slide 13 is moved to the right over a distance such that plastic is pressed away into the cavity 10A and the distance between the free end 13E and the opposite surface is reduced to a distance H in accordance with the desired bottom thickness.

Movement of the slide 28 can be obtained, for instance, with the aid of the mechanism with which the mold halves 4, 6 are pressed onto each other, but can also be effected in a different way, for instance by external means, hydraulically, pneumatically or otherwise.

The holder 92 as shown in FIG. 14 can be, for instance, a multimedia storage device, as described earlier, but may also be a different kind of device provided with parts that can be formed with moving mold parts. It will be clear that any combination of methods, apparatuses and products, as well as parts thereof and plastics which have only been mentioned by way of example is possible within the scope of the invention outlined by the claims.

In a method and apparatus according to the invention, the additional advantage is achieved that relatively low injection pressures can be used.

The invention is not limited in any way to the examplary embodiments shown in the description and the drawing. Many variations thereon are possible within the scope of the invention outlined by the claims.

Thus, different parts of different exemplary embodiments described can be combined and varied, for instance different mold shapes and different means for creating counterpressure for the movable mold parts. Also, a single mold may include several mold cavities and also products may be formed without a hinge or with several hinges. Other plastics can be used, having a relatively low Melt Flow Index, such as, for instance, PC, PON, PEN and the like. Plastic having a higher MFI, such as PP, PE and the like can also be processed using a method according to the invention, whereby at least a part of the advantages are achieved. Also products of a different kind can be manufactured with a method and apparatus according to the invention, for instance trays, household products, cladding elements, while moreover other means can be employed for closing holders, such as screw thread, bayonet means and the like, which can be integrally formed. Also, all kinds of other means can be used for biasing the movable forming members. Also, these movable forming members can be designed such that the mold parts are first moved against each other and thereupon the or each forming member is moved in such a manner, for instance with means as shown in FIG. 5, that the mold cavity if brought into the desired shape. It is incidentally noted that an advantage of the method described earlier is that deaeration of the mold cavity is possible in a particularly simple manner. If desired, or necessary, the or each movable mold part can be preheated. Also, in a mold according to the invention, two-component technique can be employed and several injection points can be used.

These and many comparable variations are understood to fall within the scope of the invention outlined by the claims.

The invention claimed is:

1. A method for forming thin-walled products from plastic in a mold, the mold including a first mold part, a second mold part, a forming member movably supported in said second mold part and a thermally insulating seal disposed between said forming member and said second mold part, the method comprising the steps of:

setting said mold to an open position, wherein said first and second mold parts are spaced apart by a distance and said forming member is extended from said second mold part whereby said thermally insulating seal thermally isolates said forming member from said second mold part;

injecting a heated plastic into a space defined between said first mold part and said forming member, wherein said plastic contacts said forming member, said forming member remaining thermally isolated from said second mold part during said injecting step whereby said plastic does not substantially cool during injection; and closing said mold to a closed position before said plastic cools, wherein said first and second mold parts make contact and said forming member comes into thermal contact with said second mold part, wherein said forming member and said plastic cool to a temperature substantially matching a temperature of said second mold part, wherein said forming member comprises thin walls defining a hollow interior.

2. A method for forming thin-walled products as defined in claim 1, wherein, during said injection and said mold closing steps, said plastic is continuously kept in motion, until the whole mold cavity is closed.

3. A method for forming thin-walled products as defined in claim 1, wherein said plastic displaces said forming member during said injection step.

4. A method for forming thin-walled products from plastic in a mold, wherein an amount of said plastic, heated, is introduced into a mold cavity while the mold is at least partly open, whereafter the mold is closed, such that the plastic in the mold cavity is pressed away by the wall parts of the mold cavity, whereby a complete filling of the mold cavity is obtained, and wherein a mold is used, said mold including a first and second mold part and a mold-forming wall part, said mold-forming wall part being movable with respect to the first mold part and thermally insulated from the first mold part when the mold is open, wherein said thermally insulated wall part of the mold has a low heat capacity that, when the plastic is introduced into said mold cavity, the plastic heats said wall part such that the temperature of the wall part is raised to a temperature close to the temperature of the plastic, while the other mold parts are kept relatively cool, and wherein during closure of the mold said movable wall part of the mold cavity is cooled by thermal conduction between said moveable wall part and the further relatively cold mold parts, wherein said movable wall part comprises thin walls defining a hollow interior.

5. A method for forming thin-walled products as defined in claim 4, wherein said plastic displaces said forming member when introduced into said mold cavity.

6. A method according to claim 4, wherein, between said at least one wall part and an opposite wall part a flow passage for the plastic is formed having a thickness ($H_x$), measured between said wall parts, that is greater than the thickness of the product part to be formed therefrom, and wherein during closure of the mold said flow passage is closed to some extent to the desired thickness for the product part to be formed at that point, wherein a plastic is used having a melt less than 18 according to ISO 1133, and wherein said plastic does not substantially cool during injection and said mold is closed before said plastic cools.

7. A method according to claim 4, wherein during the introduction of the plastic and the closure of the mold the plastic is continuously kept in motion, until the whole mold cavity is closed.

8. A method according to claim 4, wherein a mold is used in which the or each mold cavity comprises a male and a female part, at least the male part being movably confined in a mold part, the confinement being so designed that an outwardly facing surface of the male part, when the mold is open, is held a distance to an opposite surface of the female part, wherein the plastic is introduced between said surfaces under a pressure such that the male part is to some extent pushed away for providing a desired flow passage, while the pressure with which the male part is forced outwards is smaller than the pressure of the plastic when being introduced.

9. A method according to claim 4, wherein a mold is used in which the or each mold cavity comprises a male and a female part, at least the male part being movably confined in a mold part, the confinement being so designed that an outwardly facing surface of the male part, when the mold is open, is held a distance from an opposite surface of the female part, wherein the plastic is introduced, wherein the male part, at least after the plastic has been introduced, is forced in the direction of the female part for obtaining the desired product, wherein the plastic is pressed upon in the mold cavity by the male part.

10. A method according to claim 4, wherein the plastic is a transparent crystalline plastic, and wherein, prior to being introduced into the mold cavity, said transparent crystalline plastic is dried, such that at least largely the moisture is removed therefrom.

11. A method according to claim 10, wherein drying of the plastic is obtained by preheating.

12. A method according to claim 4, wherein a mold cavity is used with a Melt Flow Rate (MFR), which in closed condition, is higher than the Melt Flow Index (MFI) of the plastic to be used.

13. A method according to claim 4, wherein in the product at least one hinge is integrally formed in the mold cavity by moving said movable wall part against said second mold part.

14. A method according to claim 4, wherein a clear, translucent plastic is used.

15. A method according to claim 4, wherein a plastic is used having an MFI of less than 18.

16. A method according to claim 4, wherein PET or PE or PP plastic is used.

17. A method according to claim 4, wherein at least on the inside of a holder-shaped part of the product, a label is provided, which screens the plastic from contents to be received therein.

18. A method according to claim 4, wherein the plastic used is at least partly recycled plastic.

19. A method according to claim 17, wherein the plastic used is at least largely translucent, wherein said label is provided on the inside of the product by in-mold labeling, wherein on said label a printing is provided which is visible through the wall of the product.

20. A method for forming thin-walled products from plastic in a mold, wherein an amount of said plastic, heated, is introduced into a mold cavity while the mold is at least partly open, whereafter the mold is closed, such that the plastic in the mold cavity is pressed away by the wall parts of the mold cavity, whereby a complete filling of the mold cavity is obtained, and wherein a mold is used of which at least one wall part is movably arranged and is thermally insulated from the mold when said mold is open, wherein during introduction of the plastic, said at least one wall part is pressed away by the plastic and is heated by said plastic, such that between said at least one wall part and an opposite wall part a flow passage for the plastic is formed having a thickness (Hz), measured between said wall parts, that is greater than the thickness of the product part to be formed therefrom, and wherein during closure of the mold said flow passage is closed to some extent to the desired thickness for the product part to be formed at that point, wherein a plastic is used having a melt less than 18 according to ISO 1133, and wherein said plastic does not substantially cool during injection and said mold is closed before said plastic cools, wherein said movable wall part comprises thin walls defining a hollow interior.

21. A method for forming thin-walled products as defined in claim 20, wherein said plastic is continuously kept in motion, until the whole mold cavity is closed.

22. A method for forming thin-walled products as defined in claim 20, wherein said plastic displaces said forming member when introduced into said mold cavity.

23. A method according to claim 20, wherein during the introduction of the plastic and the closure of the mold the plastic is continuously kept in motion, until the whole mold cavity is closed.

24. A method according to claim 20, wherein a mold is used in which the or each mold cavity comprises a male and a female part, at least the male part being movably confined in a mold part, the confinement being so designed that an outwardly facing surface of the male part, when the mold is open, is held a distance to an opposite surface of the female part, wherein the plastic is introduced between said surfaces under a pressure such that the male part is to some extent pushed away for providing a desired flow passage, while the pressure with which the male part is forced outwards is smaller than the pressure of the plastic when being introduced.

25. A method according to claim 20, wherein a mold is used in which the or each mold cavity comprises a male and a female part, at least the male part being movably confined in a mold part, the confinement being so designed that an outwardly facing surface of the male part, when the mold is open, is held a distance from an opposite surface of the female part, wherein the plastic is introduced, wherein the male part, at least after the plastic has been introduced, is forced in the direction of the female part for obtaining the desired product, wherein the plastic is pressed upon in the mold cavity by the male part.

26. A method according to claim 10, wherein the plastic, prior to being introduced into the mold cavity, is dried, such that at least largely the moisture is removed therefrom.

27. A method according to claim 26, wherein drying of the plastic is obtained by preheating.

28. A method according to claim 20, wherein a mold cavity is used with a Melt Flow Rate (MFR) which in closed condition is higher than the Melt Flow Index (MFI) of the plastic to be used.

29. A method according to claim 20, wherein in the product at least one hinge is integrally formed in the mold cavity.

30. A method according to claim 20, wherein a clear, translucent plastic is used.

31. A method according to claim 20, wherein PET or PE or PP plastic is used.

32. A method according to claim 20, wherein at least on the inside of a holder-shaped part of the product a label or a covering is provided, which screens the plastic from contents to be received therein.

33. A method according to claim 32, wherein the plastic used is at least partly recycled plastic.

34. A method according to claim 32, wherein the plastic used is at least largely translucent, wherein said label is provided on the inside of the product by in-mold labeling, wherein on said label a printing is provided which is visible through the wall of the product.

* * * * *